(12) United States Patent
Spatafora et al.

(10) Patent No.: US 6,439,376 B1
(45) Date of Patent: Aug. 27, 2002

(54) POCKET CONVEYOR

(75) Inventors: Mario Spatafora, Bologna; Loris Grepioni, Castel Maggiore, both of (IT)

(73) Assignee: G. D Societa' per Azioni, Bologna (IT)

( * ) Notice: Subject to any disclaimer, the term of this patent is extended or adjusted under 35 U.S.C. 154(b) by 0 days.

(21) Appl. No.: 09/597,479

(22) Filed: Jun. 20, 2000

(30) Foreign Application Priority Data

Jun. 22, 1999 (IT) .......................................... B099A0338

(51) Int. Cl.⁷ ............................ B65G 15/00; B65G 15/22
(52) U.S. Cl. ............................. 198/803.14; 198/469.1; 198/803.15
(58) Field of Search ........................ 198/469.1, 803.14, 198/803.15, 711

(56) References Cited

U.S. PATENT DOCUMENTS

| | | | | |
|---|---|---|---|---|
| 3,036,694 A | * | 5/1962 | Eger | |
| 3,805,947 A | * | 4/1974 | Ward | |
| 4,252,235 A | | 2/1981 | Schepers et al. | ............ 198/822 |
| 5,121,585 A | | 6/1992 | Focke et al. | ............... 53/136.1 |
| 5,548,941 A | * | 8/1996 | Portaro et al. | |
| 6,000,196 A | * | 12/1999 | Boldrini et al. | |

FOREIGN PATENT DOCUMENTS

DE            1 120 365       * 12/1961

* cited by examiner

Primary Examiner—Stephen T. Gordon
Assistant Examiner—Scott Carpenter
(74) Attorney, Agent, or Firm—Ladas & Parry

(57) ABSTRACT

A pocket conveyor wherein a flexible toothed belt is fitted with conveying pockets equally spaced along the belt, and wherein each pocket is connected to the belt by a first and at least one second connecting member, both hinged to the belt; the first connecting member is connected rigidly to the pocket; and the second connecting member has at least one degree of freedom with respect to the pocket.

14 Claims, 1 Drawing Sheet

POCKET CONVEYOR

FIELD OF THE INVENTION

The present invention relates to a pocket conveyor.

In particular, the present invention relates to a pocket conveyor extending along a mixtilinear path and comprising a flexible conveying belt, at least one conveying pocket, and connecting means interposed between the conveying belt and the pocket to enable the pocket to move with the conveying member along said path.

The present invention is particularly advantageous for use on conditioning machines employed in the tobacco industry, to which the following description refers purely by way of example.

BACKGROUND OF THE INVENTION

In the tobacco industry, conditioning-packing machines are employed whereby groups of cigarettes are fed from a hopper inside respective pockets of a conveyor, which moves the pockets along a mixtilinear, in particular an endless, path. Each pocket is substantially U-shaped, is connected to an endless flexible conveying member normally defined by a chain, and normally comprises a front and rear connection connected respectively to the front and rear end of the same link in the chain to maintain the same distance at all times between the connections of the pocket alongside variations in the shape of the path portion traveled by the pocket.

Pocket conveyors of the type described above have several drawbacks, foremost of which are the invariable slack and high noise level of the chain.

U.S. Pat. No. 5,121,585 A1 discloses a pocket conveyor wherein a flexible toothed belt is fitted with conveying pockets equally spaced along the belt, and wherein each pocket is connected to the belt by a first and a second connecting member, both hinged to the belt and both having at least one degree of freedom with respect to the pocket. The pocket conveyor disclosed in U.S. Pat. No. 5,121,585 A1 reduces considerably the slack and high noise level with respect to a known chain conveyor, thus at least partially overcoming the aforementioned drawbacks; however, when feeding the belt conveyor with articles, each pocket tends to oscillate in a direction parallel with the feeding direction (in particular in the curved portion of the path) and this kind of oscillation is particularly harmful, because it tends to seriously damage the belt and of the connecting member, thus introducing a variable (i.e. random) error in the position of the pockets.

SUMMARY OF THE INVENTION

It is an object of the present invention to provide a pocket conveyor designed to eliminate the aforementioned drawbacks.

According to the present invention, there is provided a pocket conveyor having a particular connection between a pocket and a flexible conveyor belt to permit the pocket to follow the belt along its path of travel without damage to the belt.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
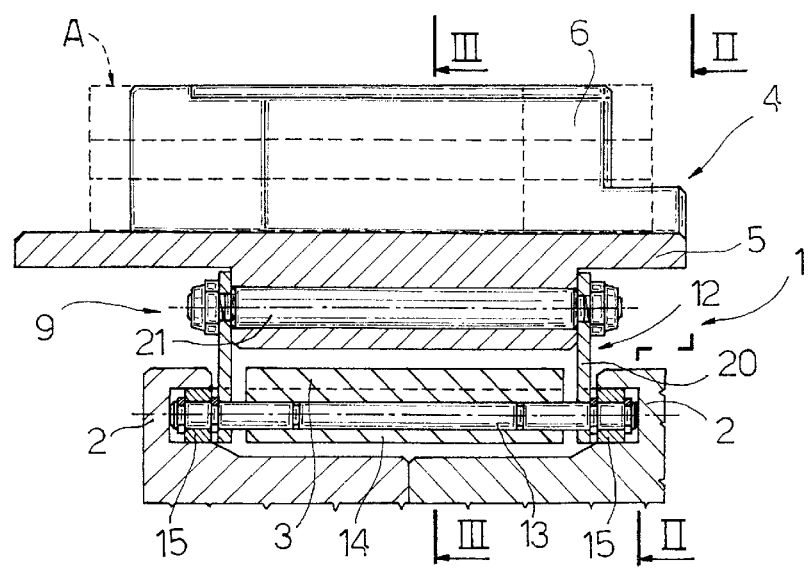
FIG. 1 shows a cross section, with parts removed for clarity, of a preferred embodiment of the conveyor according to the present invention.
Figure 2:
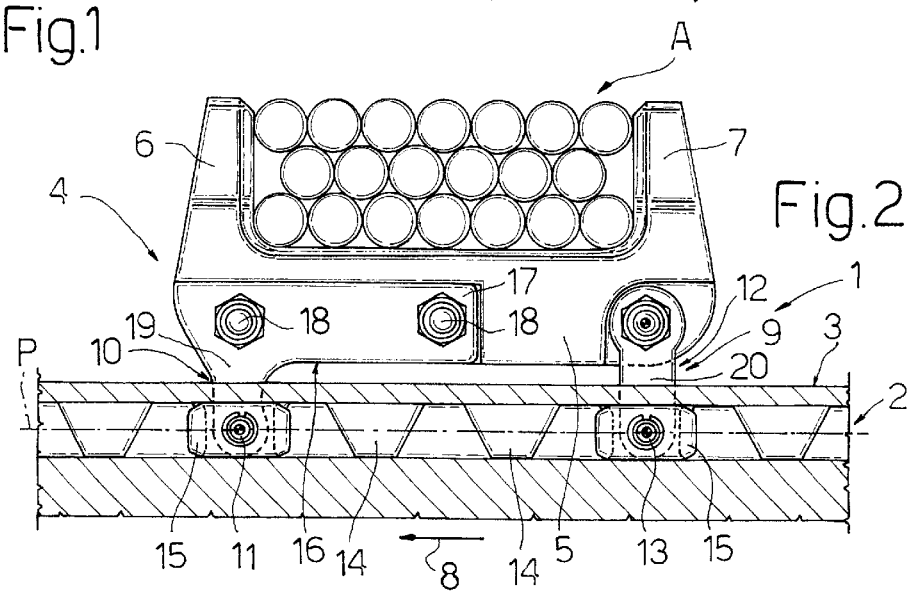
FIG. 2 shows a section along line II—II in FIG. 1.
Figure 3:
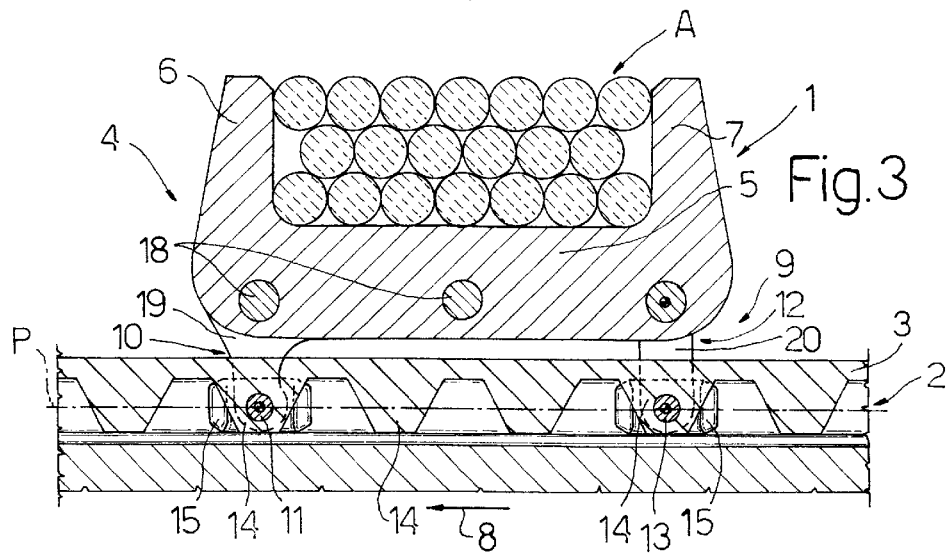
FIG. 3 shows a section along line III—III in FIG. 1.

Number 1 in the accompanying drawings indicates as a whole an input conveyor of a cigarette packing machine.

Conveyor 1 is a conveyor extending along a mixtilinear path P—in the example shown, a known endless path, of which only a substantially straight portion defined by two facing guides 2 is shown for the sake of simplicity—and comprises a flexible conveying member defined by a belt 3 between guides 2, and a number of pockets 4 equally spaced along belt 3 and each for housing a product A defined, in the example shown, by a group of cigarettes.

In the example shown, each pocket 4 is substantially U-shaped with the concavity facing upwards, and comprises a base plate 5 facing and substantially parallel to a respective portion of belt 3; and two lateral walls 6 and 7 extending upwards from a front and rear end respectively of pocket 4 with reference to the traveling direction 8 of belt 3.

Each pocket 4 is connected to belt 3 by a respective connecting device 9 so as to move with belt 3 along path P. Connecting device 9 comprises a front connecting member 10, which is interposed between a front end of base plate 5 and belt 3, is rigidly connected to plate 5, and is hinged to belt 3 by a respective pin 11 extending crosswise to, and enclosed within the thickness of, belt 3. Connecting device 9 also comprises at least one rear connecting member 12 (in the example shown, only one rear connecting member 12 is provided, though other members 12 may be added in series with the one shown, depending on the length of pocket 4) which is interposed between a rear end of base plate 5 and belt 3, is connected to base plate 5 so as to have at least one degree of freedom with respect to plate 5, and is hinged to belt 3 by a respective pin 13 parallel to pin 11 and also enclosed within the thickness of belt 3.

More specifically, belt 3 is a toothed belt having a number of transverse teeth 14 equally spaced along belt 3; and each of pins 11 and 13 is fitted through belt 3 inside the thickness of a respective tooth 14, so that each of the opposite ends of the pin engages a respective guide 2 via the interposition of a respective shoe 15.

Front connecting member 10 comprises two parallel arms 16 located on opposite sides of belt 3 and each hinged to a respective end of pin 11. Each arm 16 is substantially L-shaped and comprises a portion 17 extending along base plate 5 of pocket 4 and connected integrally to plate 5 by two screws 18; and a further portion 19 extending from pocket 4 towards belt 3, and having a through hole for connection to the respective end of pin 11, to which portion 19 is locked axially by a retaining ring.

Rear connecting member 12 also comprises two parallel arms located on opposite sides of belt 3 and each hinged to a respective end of pin 13. Each arm is defined by a connecting rod 20 hinged and locked at one end to a respective end of a through pin 21 extending, parallel to screws 18, through base plate 5 of pocket 4 in a direction perpendicular to direction 8. At the opposite end to that connected to pin 21, each connecting rod 20 has a through hole for connection to the respective end of pin 13, to which connecting rod 20 is locked by a retaining ring.

In pocket conveyor 1 as described above, front connecting member 10 enables pocket 4 to travel with belt 3 without oscillating in direction 8, while connecting rods 20 of rear connecting member 12 prevent the formation, between pocket 4 and belt 3, of stress caused by variations in the distance between pins 11 and 13 alongside variations in the curvature of the portion of belt 3 extending between pins 11 and 13.

What is claimed is:

1. A pocket conveyor extending along a mixtilinear path (P) and comprising a flexible belt (3), at least one conveying pocket (4), and connecting means (9) interposed between the flexible belt (3) and the pocket (4) to enable the pocket (4) to move with the flexible belt (3) along said path (P); said connecting means (9) comprising a first and at least one second connecting member (10, 12), both hinged to the belt (3), the first connecting member (10) being connected rigidly to the pocket (4), and the second connecting member (12) having at least one degree of freedom with respect to the pocket (4).

2. A conveyor as claimed in claim 1, wherein each of said first and second connecting members (10, 12) is hinged to said belt (3) by a respective pin (11; 13) carried by the belt (3) and extending crosswise to the belt (3).

3. A conveyor as claimed in claim 2, wherein each of said first and second connecting members (10; 12) comprises two parallel arms located on opposite sides of said belt (3); each said arm being hinged to a respective end of the transverse pin (11; 13) of the respective said connecting member.

4. A conveyor as claimed in claim 1, wherein said first and second connecting members (10, 12) are located respectively at the front and rear of said pocket (4) with reference to the traveling direction of said belt (3) along said path (P).

5. A pocket conveyor extending along a mixtilinear path (P) and comprising a flexible belt (3), at least one conveying pocket (4), and connecting means (9) interposed between the flexible belt (3) and the pocket (4) to enable the pocket (4) to move with the flexible belt (3) along said path (P); said connecting means (9) comprising a first and at least one second connecting member (10), 12), both hinged to the belt (3), the first connecting member (10) being connected rigidly to the pocket (4), and the second connecting member (12); having at least one degree of freedom with respect to the pocket (4); said belt (3) being of a given thickness; and each of said first and second connecting members (10, 12) being hinged to said belt (3) by a respective transverse pin (11, 13) extending through the belt (3) inside the thickness of the belt (3).

6. A conveyor as claimed in claim 5, wherein each of said first and second connecting members (10; 12) comprises two parallel arms located on opposite sides of said belt (3); each said arm being hinged to a respective end of the transverse pin (11; 13) of the respective said connecting member.

7. A conveyor as claimed in claim 6, wherein each arm of said first connecting member (10) is substantially L-shaped and comprises a first portion extending along said pocket (4) and integral with the pocket (4), and a second portion extending from the pocket (4) towards said belt (3) and hinged to the belt (3).

8. A conveyor as claimed in claim 7, wherein each arm of the second connecting member (12) comprises a connecting rod hinged at one end to said pocket (4) and at the other end to said belt (3).

9. A conveyor as claimed in claim 5, further comprising at least one guide extending along said path (P) at the side of said belt (3); each said pin (11; 13) having a respective end facing said guide, and supporting, on said end, a shoe connected in sliding manner to said guide.

10. A conveyor as claimed in claim 5, wherein said first and second connecting members (10, 12) are located respectively at the front and rear of said pocket (4) with reference to the traveling direction of said belt (3) along said path (P).

11. A pocket conveyor extending along a mixtilinear path (P) and comprising a flexible belt (3), at least one conveying pocket (4), and connecting means (9) interposed between the flexible belt (3) and the pocket (4) to enable the pocket (4) to move with the flexible belt (3) along said path (P); said connecting means (9) comprising a first and at least one second connecting member (10, 12), both hinged to the belt (3), the first connecting member (10) being connected rigidly to the pocket (4), and the second connecting member (12) having at least one degree of freedom with respect to the pocket (4); said belt (3) being a toothed belt (3) having a number of transverse teeth (14) equally spaced along the belt (3); and each of said first and second connecting members (10, 12) being hinged to said belt (3) by a respective transverse pin (11; 13) extending through the belt (3) inside the thickness of a respective said tooth (14).

12. A pocket conveyor extending along a mixtilinear path (P) and comprising a flexible bolt (3), at least one conveying pocket (4), and connecting means (9) interposed between the flexible belt (3) and the pocket (4) to enable the pocket (4) to move with the flexible belt (3) along said path (P); said connecting means (9) comprising a first and at least one second connecting member (10, 12), both hinged to the belt (3), the first connecting member (10) being connected rigidly to the pocket (4), and the second connecting member (12) having at least one degree of freedom with respect to the pocket (4); each of said first and second connecting members (10, 12) being hinged to said belt (3) by a respective pin (11; 13) carried by the belt (3) and extending crosswise to the belt (3); and at least one guide extending along said path (P) at one side of said belt (3); each said pin (11; 13) having a respective end facing said guide, and supporting, on said end, a shoe connected in sliding manner to said guide.

13. A pocket conveyor extending along a mixtilinear path (P) and comprising a flexible belt (3), at least one conveying pocket (4), and connecting means (9) interposed between the flexible belt (3) and the pocket (4) to enable the pocket (4) to move with the flexible belt (3) along said path (P); said connecting means (9) comprising a first and at least one second connecting member (10, 12), both hinged to the belt (3), the first connecting member (10) being connected rigidly to the pocket (4), and the second connecting member (12) having at least one degree of freedom with respect to the pocket (4); each of said first and second connecting members (10, 12) being hinged to said belt (3) by a respective pin (11; 13) carried by the belt (3) and extending crosswise to the belt (3); each of said first and second connecting members (10; 12) comprising two parallel arms located on opposite sides of said belt (3) each said arm being hinged to a respective end of the hinge pin (11; 13) of the respective said connecting member; each arm of said first connecting member (10, 12) being substantially L-shaped and comprising a first portion extending along said pocket (4) and integral with the pocket (4), and a second portion extending from the pocket (4) towards said belt (3) and hinged to the belt (3).

14. A conveyor as claimed in claim 13, wherein each arm of the second connecting member (10, 12) comprises a connecting rod hinged at one end to said pocket (4) and at the other end to said belt (3).

* * * * *